United States Patent [19]
Yamazaki et al.

[11] Patent Number: 5,398,088
[45] Date of Patent: Mar. 14, 1995

[54] PICTURE-FORMAT SWITCHABLE CAMERA

[75] Inventors: Yasuo Yamazaki, Hino; Hideaki Kume, Hachioji, both of Japan

[73] Assignee: Olympus Optical Co., Ltd., Tokyo, Japan

[21] Appl. No.: 191,752

[22] Filed: Feb. 4, 1994

Related U.S. Application Data

[63] Continuation of Ser. No. 920,992, Jul. 28, 1992, abandoned.

[30] Foreign Application Priority Data

Aug. 2, 1991 [JP] Japan .................. 3-194455

[51] Int. Cl.$^6$ .......................................... G03B 17/24
[52] U.S. Cl. ...................................... 354/106; 354/94; 354/159
[58] Field of Search ............... 354/94, 95, 96, 98, 354/99, 105, 106, 159

[56] References Cited

U.S. PATENT DOCUMENTS

| | | | |
|---|---|---|---|
| 4,994,830 | 2/1991 | Harvey | 354/106 |
| 5,057,857 | 10/1991 | Hata et al. | 354/106 |
| 5,086,311 | 2/1992 | Naka et al. | 354/94 X |

FOREIGN PATENT DOCUMENTS

| | | |
|---|---|---|
| 63-27823 | 2/1988 | Japan . |
| 139327 | 6/1988 | Japan . |
| 84820 | 8/1991 | Japan . |
| 210547 | 9/1991 | Japan . |

Primary Examiner—Howard B. Blankenship
Attorney, Agent, or Firm—Louis Weinstein

[57] ABSTRACT

The picture-format switchable camera of the present invention is fabricated with a photographic optical system which, in this invention, is a photographic lens; a display unit portion having a lamp light source, a reflection mirror, a condenser lens, and a liquid crystal display; and a mechanical portion, for switching the image plane, having a mask for switching the image plane while retaining an objective lens of an image-forming optical system for inscribing data and a total reflection mirror, and a mask B located in the position facing the mask A; wherein a data-inscribing operation can form the image of the inscribing data on a film by moving the data-inscribing optical system such as the objective lens being interlocked with the up-and-down movement of the mask. Accordingly, an image of the inscribing data can be formed in the predetermined position in accordance with the switched picture format.

24 Claims, 6 Drawing Sheets

IMPRINTED
CHARACTERS

IMPRINTED
CHARACTERS

PICTURE-FORMAT SWITCHABLE CAMERA

This is a continuation of application Ser. No. 07/920,992, filed Jul. 28, 1992, now abandoned.

BACKGROUND OF THE INVENTION

1. Field of the Invention

The present invention relates to a picture-format switchable camera capable of switching picture formats and also capable of inscribing data on the switched image plane.

2. Related Art Statement

In recent years, cameras are becoming multi-functioned. Among cameras capable of switching picture-formats on a film image-plane, such a camera is already on the market that can switch picture-formats of the film image-plane between a commonly used normal-size (24 mm×36 mm) and a panoramic size (13 mm×36 mm). Panoramic photography provides a print of a wider width and is suitable especially for wide-angle photography. In conjunction with switching picture formats, data inscription on each picture format is required and various proposals have been made regarding data-inscribing devices for this type of camera. In Japanese Patent Laid-Open publication No. 63-139327, there is disclosed a data-inscribing device of a picture-format switchable camera with liquid crystal displays, having different character strings, one of which is disposed in the position above one line in front of a film; having two incandescent lamps as light sources; thus, enabling data inscription by lighting either one of the two incandescent lamps in accordance with the picture format.

Another data-inscribing device, disclosed in Japanese Patent Laid-Open Publication No. 3-210547 and proposed by the same applicant of the present invention, is not for the picture-format switchable camera, but it provides an objective lens and a reflection member which constitute an image-forming optical system for inscribing data in an intermediate position between the liquid crystal display and the film so as not to interrupt the luminous flux. As a related art, the normal-size/panoramic-size switchable camera, disclosed in Japanese Patent Laid-Open Publication No. 3-000155 which was previously proposed also by the applicant of the present invention, pertains to a camera having the above function of switching the image planes.

However, in the data-inscribing device for the switched picture format, disclosed in the above described Japanese Patent Laid-Open Publication No. 63-139327, two light sources and two liquid crystal displays are required, which causes disadvantages in cost and space and additionally requires a detecting switch for a switching operation of the picture formats to enable the switching electrically.

The picture-format switchable camera disclosed in the above described Japanese Patent Laid-Open Publication No. 3-000155 does not take the data-inscribing function into consideration; therefore, when data are inscribed on the film using the conventional data-inscribing device of this camera, the image of date-characters is projected outside of an effective image-plane in the panoramic photography, thus the date-characters cannot be printed on the frame of the film when the panoramic-size film is printed.

The data-inscribing device disclosed in the above described Japanese Patent Laid-Open Publication No. 3-210547 also does not provide the data-inscription corresponding to switching picture formats between normal-size and panoramic-size.

OBJECTS AND SUMMARY OF THE INVENTION

In view of the above described drawbacks of the prior art, an object of the present invention is to provide a data-inscribing device having the capability of inscribing data for both normal-size and panoramic-size photography, which overcomes the shortcomings of conventional data-inscribing devices, and also has a mechanically simple configuration.

The data-inscribing camera of the present invention has the capability of switching picture-formats of a film frame between normal size and panoramic size; and integrates a data-inscribing device for inscribing data shown on the liquid crystal display on the film by means of a light source; wherein an image-forming optical system provided between the liquid crystal display and the film surface moves in accordance with the switching operation of the picture formats, rays from the liquid crystal display form an image of inscribing data on a predetermined position of each switched picture-format through the image-forming optical system.

These and other objects, features, and advantages of the invention will become more apparent from the following description.

DETAILED DESCRIPTION OF THE PREFERRED EMBODIMENTS

A detailed description of preferred embodiments of the present invention will now be given in conjunction with the accompanying drawings.

Figure 1:
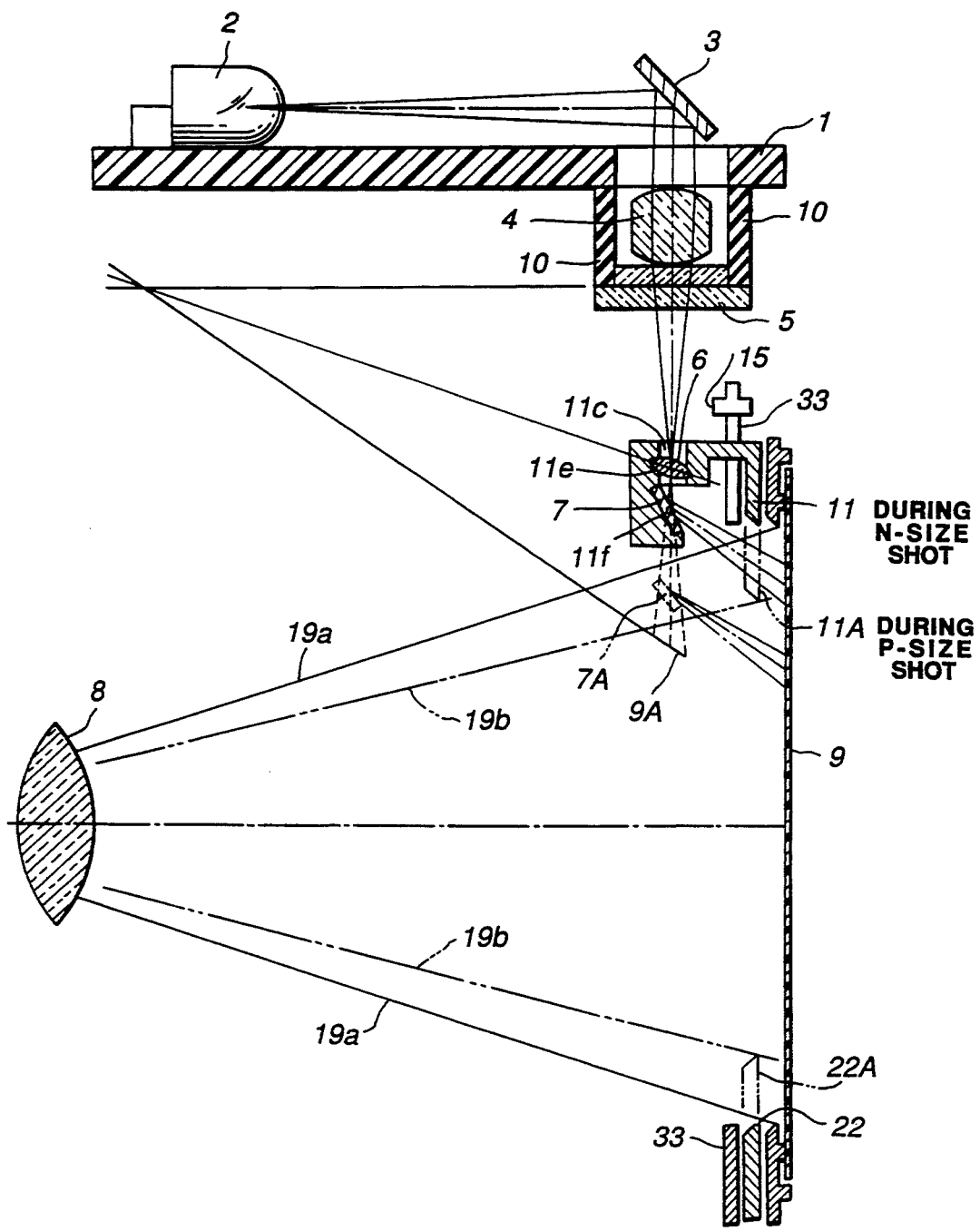
FIG. 1 is a view illustrating a configuration of an essential portion of a first embodiment of a picture-format switchable camera according to the present invention.

FIG. 1 illustrates a configuration of an essential portion of a first embodiment of a picture-format switchable camera according to the present invention. This picture-format switchable camera has integrated the data-inscribing device corresponding to each switched picture format of a film, namely each switched picture format for photography, and enables data inscribing on a predetermined position of each switched picture-format. Meanwhile, there are two image planes switchable in sizes: an image plane of normal size (hereinafter defined as N-size) in the mode of the normal size photography (hereinafter defined as N-size mode), and an image plane of a half size in a half size photography or an aforementioned panoramic size (hereinafter defined as P-size) in the mode of the panoramic size photography (hereinafter defined as P-size mode). The camera of the present invention is switchable between the image planes of the normal size in the N-size mode and the image plane of the panoramic size in the P-size mode.

In the preferred embodiment of the present invention, the camera comprises a subject photographic portion where luminous fluxes 19a and 19b of the N-size and P-size modes respectively from a photographic lens 8 form an image on a film 9 situated at an aperture 44d of a camera body 44 (shown in FIG. 5), thus enabling photographing; a picture-size switching mechanical portion having picture-format switching masks 11 and 22 which are situated facing each other; and a data-inscribing device. The masks are movable between an N-shot size represented by solid lines 11, 22 and a P-shot size as shown by dotted lines 11A, 22A.

The data-inscribing device comprises a display unit portion which includes a lamp light source 2, reflection mirror 3, condenser lens 4, and a liquid crystal display 5; and an image-forming optical system for inscribing data which is provided between the liquid crystal display 5 and the film 9.

Figure 2:
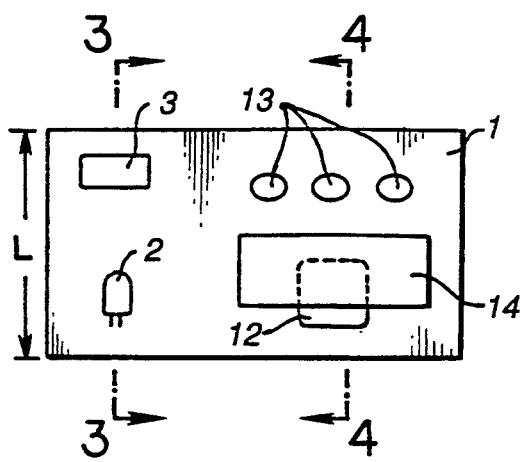
FIG. 2 is a plan view illustrating a configuration of a printed board of a display panel portion for a data-inscribing device of the picture-format switchable camera shown in FIG. 1.
Figure 3:
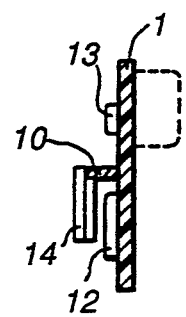
FIG. 3 is a section view taken along the line 3—3 of FIG. 2.
Figure 4:
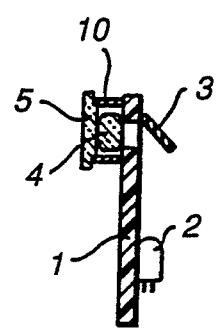
FIG. 4 is a section view taken along the line 4—4 of FIG. 2.

Further detailed description of the display unit portion will now be given in connection with FIGS. 2 to 4. The display unit portion comprises a liquid crystal display portion 14 for external data, a clock/liquid crystal driver IC12, data-selection switches 13, the reflection mirror 3, the lamp light source 2, the condenser lens 4, and liquid crystal display 5 for inscribing data display 5 being mounted through a conductive rubber connector 10, and these component members are integrated in one unit on a electric circuit board 1. Thus, the display unit portion in which the above component members are integrated in one unit with the circuit board 1, which is mounted in the exterior upper wall in the upper portion of the camera body 20 (shown in FIG. 10). In this display unit portion, rays from the lamp light source 2 are irradiated toward the back along the circuit board 1, then are reflected downwardly by the mirror 3, pass through the liquid crystal display 5 for inscribing data via the condenser lens 4, and radiated into an image-forming optical system. Meanwhile, the condenser lens 4 is designed so as to form the image of a filament of the lamp light source 2 at the location of an objective lens 6 of the image-formation optical system for inscribing data.

The image-forming optical system includes the objective lens 6 which is supported by the picture-format switching mask 11 which moves up and down during the picture-format switching operation, and is fixed obliquely in a lens mounting portion 11e of the mask 11; and a total reflection mirror 7 fixed obliquely in a protruded area 11f. Transmitted light from the crystal display 5 is taken in at an aperture 11c of the mask 11, passes through the objective lens 6, is reflected towards the film 9 by the total reflection mirror 7, thus an image of the inscribing data is successfully formed. The liquid crystal display 5, the objective lens 6, and a face indicated by 9A corresponding to the surface of the film 9 in FIG. 1 are in a conjugated position via total reflection lens 7; therefore, the image of the inscribing characters as data in the liquid crystal 5 are clearly formed on the photosensitive surface of the film 9. However, the condition of the image formation of data in P-size mode comparing with that of the N-size mode is permissibly within the range of a predetermined depth of focus.

The following is a description of the operation of each photographic mode of the image-forming optical system of inscribing data. In the N-size mode, when a selector knob 15 of a P-ring 33 is operated, the mask 11 is retracted upwardly to the position where the mask 11 itself, the objective lens 6 fixed obliquely in the mounting portion 11e of the mask 11, and the total reflection mirror 7 mounted obliquely in the protruded area 11f do not interrupt the luminous flux 19a of the N-size mode, at the same time a mask 22 is retracted downwardly, thus enabling switching the image plane to the N-size. In this condition, rays of the light source 2 pass through the liquid crystal display 5 via the mirror 3 and the condenser lens 4; pass through the objective lens 6 via the aperture 11c of the image-forming optical system of the mask 11; are reflected by the total reflection mirror 7; then the data image is formed on the predetermined position of the film 9; thus enabling the inscription of data (shown in FIG. 8).

On the other hand, in the P-size mode, in the same manner as described above, the selector knob is operated to move the masks 11 and 22 to the position where the end faces 11d and 22d of respective masks (shown in FIG. 7) regulate the image plane of the P-size (the positions of 11A and 22A in FIG. 1), thus enabling the switching of the image plane. Under this circumstance, also, the objective lens 6, the total reflection mirror 7 and its supporting portion should be in a position of not interrupting the luminous flux 19b of the P-size mode. In FIG. 1, the total reflection mirror is moved to the position of 7A. Then, the data-inscribing operation in the P-size mode is the same as that of the N-size mode: Rays of the light source 2 pass through the liquid crystal display 5 via the mirror 3 and the condenser lens 4; pass through the objective lens 6; are reflected by the total reflection mirror 7; then the image of data is formed on the predetermined position of the film 9, thus enabling the inscription of data (shown in FIG. 9).

Meanwhile, the liquid crystal display 5, the objective lens 6, and the film 9 are in a conjugated position via total reflection lens 7; thus, the image of data-inscribing characters of the liquid crystal 5 is formed clearly on the photosensitive surface of the film 9.

Figure 5:
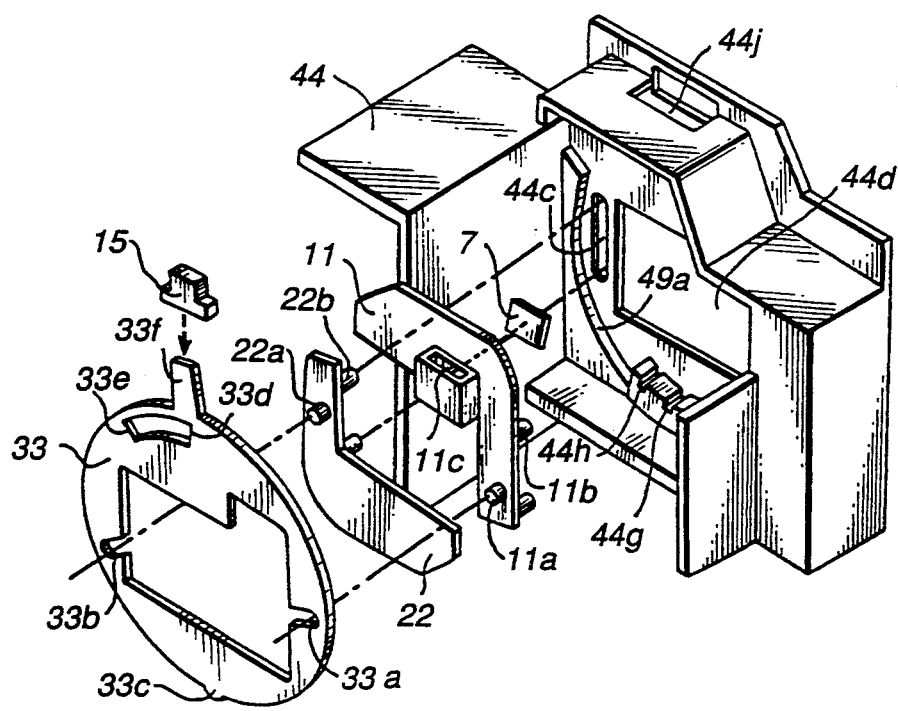
FIG. 5 is an exploded perspective view illustrating a mechanism of switching the picture size of the picture-format switchable camera shown in FIG. 1.

A detailed description of the mechanical portion for the picture-format switching which supports the image-forming optical system and switches the picture format will be given in conjunction with FIGS. 5 to 7.

The above mechanical portion provided in front of a normal aperture portion 44d of the camera body 44 mainly comprises the movable masks 11 and 22 for switching the picture format, and a P-ring 33 which rotatably fits in the fit-area 49a of the camera body 44 with the regulated axial movement and operates the opening and closing movement of the above masks 11 and 22. Both the masks 11 and 22 are movable upwardly and downwardly with guide pins 11b and 22b respectively guided in linear guiding slots 44c of the camera body 44. Furthermore, the selector knob 15 which is secured to a manipulating arm 33f of the P-ring 33 is externally operable to rotate the P-ring 33 such that the masks 11 and 22 can be moved to the switching position of each picture format through drive pins 11a and 22a of the masks 11 and 22 respectively which respectively slidably fit elongated cut-outs 33a and 33b provided in the inner peripheral area of the P-ring 33. Accordingly, when setting to the N-size, P-ring 33 should be rotated counterclockwise (hereinafter defined as CCW), as is shown in FIG. 6, to move each end face 11d, 22d of the mask 11 and 22 to the position where these masks do not interrupt a normal opening portion 44d. When setting to the P-size, the P-ring 33 should be rotated clockwise (hereinafter defined as CW), as is shown in FIG. 7, to move the masks to the position where they can provide an appropriate height for the image plane of the P-size.

Meanwhile, the operating arm 33f of the P-ring 33 is inserted through an elongated hole 44j of the camera body 44. As shown in FIGS. 6 and 7, the rotating position of the P-ring 33 is regulated by an abutment of a protruded portion 44b of the camera body against each end face 33d and 33e of an arcuate stopper hole of the P-ring 33 where the protruded portion 44b is inserted, thus providing the N-size position and P-size position of each mask 11 and 22. Concurrently, a protruded portion 33c of the P-ring 33 fits into click recesses 44g or 44h of the camera body 44 with predetermined detent force to selectively maintain each picture format position. Additionally, the objective lens 6 and the total reflection mirror 7 of the image-forming optical system are secured to the mask 11, as described before, so as to move upwardly or downwardly in accordance with the movement of the mask 11.

The following is a description of the operation of the above described mechanical portion for switching the picture format.

Figure 6:
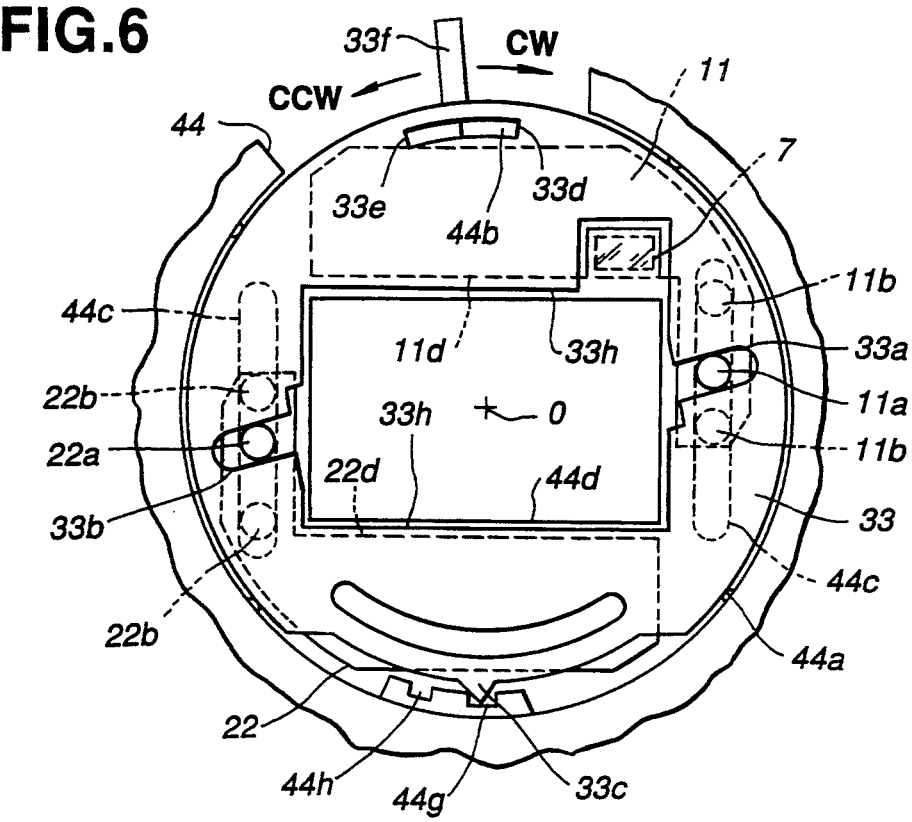
FIG. 6 is an elevational view illustrating the mechanism for switching the picture format of the camera shown in FIG. 1 to a normal-size mode.
Figure 7:
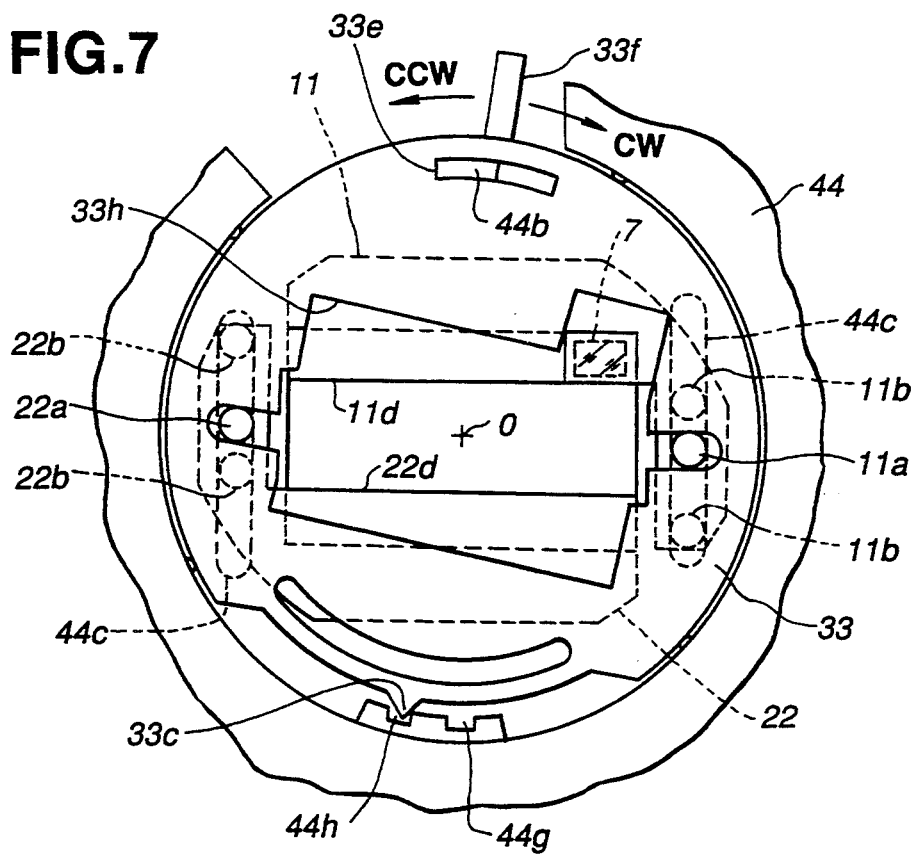
FIG. 7 is an elevational view illustrating the mechanism for switching the picture format of the camera shown in FIG. 1 to a panoramic-size mode.

For setting the camera into the N-size mode, P-ring 33 should be rotated in the CCW direction, then the picture format is in N-size mode condition as shown in FIG. 6. Also, the masks 11 and 22 are positioned with a clearance in distance and located outside of the normal aperture portion of the camera body 44; therefore, a N-size area of an actual image plane is determined by the aperture portion 44d. Under this circumstance, the abutment face 33d of the P-ring abuts the right-hand end of stopper 44b and the click protruded portion 33c fits in the click recess 44g.

On the other hand, for switching the camera to the P-size mode, the operation arm 33f of the P-ring 33 is rotated clockwise from the above position. The pins 11a and 22b of the masks 11 and 22 respectively are driven by the elongated cut-outs 33a and 33b of the P-ring 33, and the masks 11 and 22 move downwardly and upwardly respectively along the linear guiding slots 44c. Then, the abutment face 33e abuts the left-hand end of stopper 44b and the click protruded portion 33c of the P-ring 33 fits in the click recess 44h as shown in FIG. 7. Accordingly each of the end faces 11d and 22d of the masks 11 and 22 respectively get closer to a predetermined clearance and move to the position where the picture-format area of the P-size (panoramic size) is formed.

The following is a description of the switching actuation of the data inscriptions in the N-size and P-size photographic modes.

Figure 8:
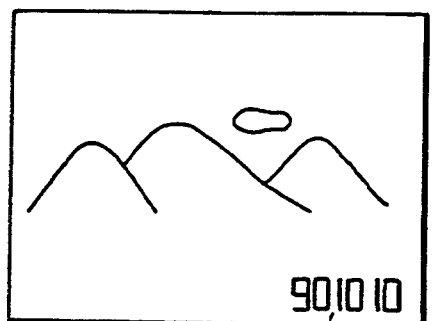
FIG. 8 is a view illustrating an example of inscribing data of the picture-format switchable camera shown in FIG. 1 in the normal picture format.
Figure 9:
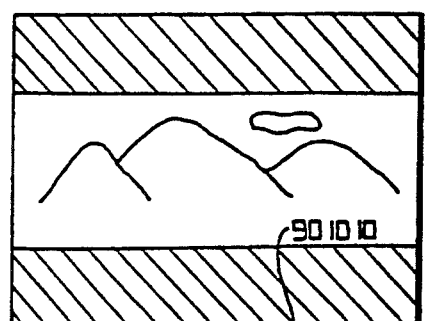
FIG. 9 is a view illustrating an example of inscribing data of the picture-format switchable camera shown in FIG. 1 in the panoramic picture-format.

In the N-size mode, the masks 11 and 22, the objective lens 6, the total reflection mirror 7 and its supporting portion 11f are so situated as not to interrupt the luminous flux 19a of the N-size photography, and, for example, the inscribing characters shown in FIG. 8 are inscribed on the image plane of the N-size during photographing. When the selector knob 15 of the P-ring 33 is operated to switch the picture format into the P-size mode, the masks 11 and 22 move to the position of the P-size mode where the masks get closer each other. At this time, the objective lens 6 and the total reflection mirror 7 also descend integrally with the mask 11 to the position where they do not interrupt the luminous flux 19b of the P-size mode. Under this situation, the distance between the liquid crystal display member and the image-formation position is extended a little further though it is still within the range of the predetermined depth of focus. In this case, the characters to be inscribed on the image plane become smaller than that of the above N-size mode, and the FIG. 9 illustrates one example of inscribing the characters in this mode.

Figure 10:
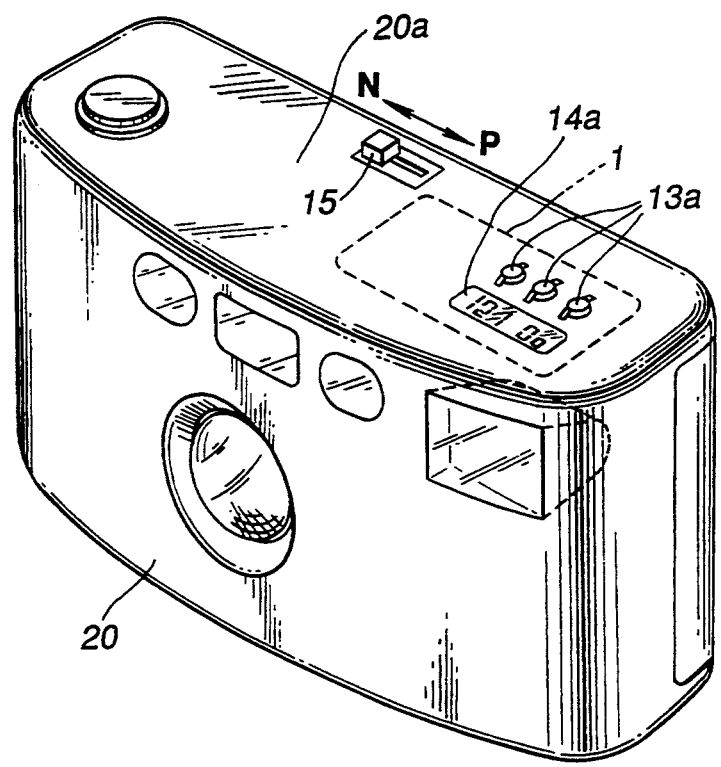
FIG. 10 is a perspective view of the picture-format switchable camera shown in FIG. 1.

In the first embodiment of the above fabricated camera in which predetermined data are to be inscribed on the image planes of the N-size and P-size modes, as the liquid crystal display portion 14 for displaying the above external data and the data-selection switches 13 (shown in FIGS. 2 to 4) are provided on the same side of the lamp light source 2 of the circuit board 1, a display panel window 14a of the liquid crystal display portion 14 for displaying external data and operation buttons 13a of the data-selection switches 13 can be provided on the top face 20a of the camera body 20 as shown in FIG. 10, thus making the panel window very conspicuous to users and having the buttons at the users' fingertips. In addition, the display panel window 14a cannot be obscured by the user's fingers or palm holding the camera. Furthermore, as the condenser lens 4 is used in this camera, a distance between the liquid crystal display 5 and the lamp light source 2 can be shortened, and the longitudinal span L along the optical axis of the circuit board 1 as shown in FIG. 2 can be minimized, thus the circuit board 1 can be compacted or downsized and the total thickness of the camera will not become larger even if the circuit board 1 is provided on the top in the camera body 20.

In addition, when it is switched to the P-size mode, the inscribing optical system is also switched simultaneously because the switching operation is interlocked with the optical system, thus a switch for detecting the switched panoramic mode, for example, being unnecessary. In addition, the size of the inscribed characters of the P-size image plane becomes smaller than those of the N-size image plane, which effectively suppresses the size of the enlarging characters during printing of the P-size image plane because P-size printing has a greater enlargement ratio in the film printing. Furthermore, only one set of the light source 2 and the liquid crystal display 5, the same set used for the conventional camera having only the N-size mode function, need be employed for this picture-format switchable camera, thus providing an advantage in cost.

Figure 11:
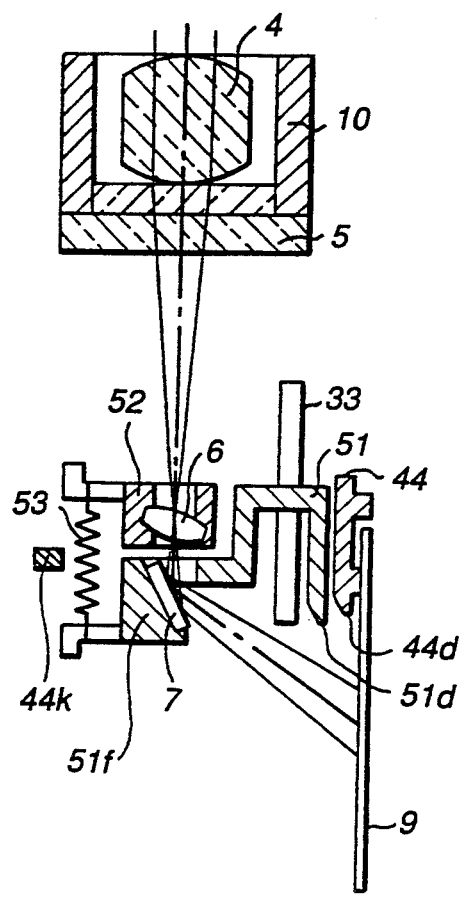
FIG. 11 is a view illustrating a configuration of an essential portion of the data-inscribing device of the normal-size mode in a second embodiment of the picture-format switchable camera according to the present invention.
Figure 12:
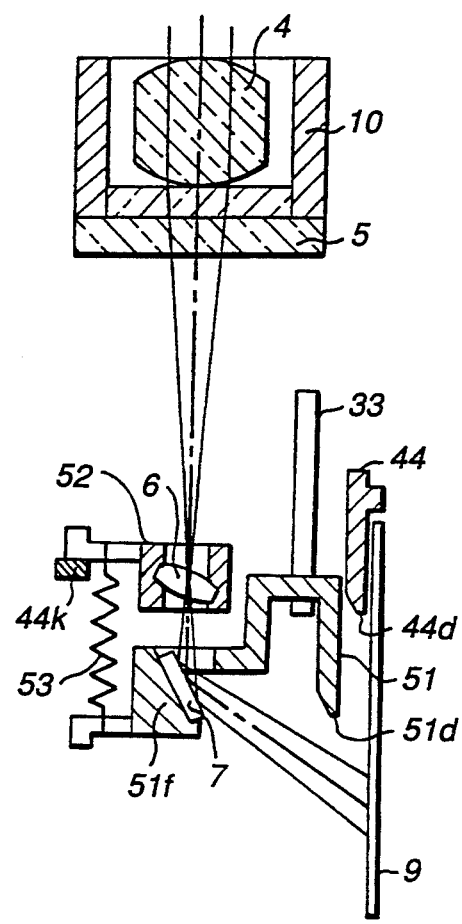
FIG. 12 is a view illustrating the data-inscribing device shown in FIG. 11 of the panoramic-size mode of the picture-format switchable camera.

A description of a second embodiment of a picture-format switchable camera according to the present invention will now be given in conjunction with FIGS. 11 and 12 wherein FIG. 11 and FIG. 12 illustrate the conditions of the inscribing optical systems for the N-size mode and the P-size mode respectively.

In the first embodiment of the present invention, the image-formation surface of the inscription on the image plane of the P-size mode is within the depth of focus; however, it is inevitable for the image to be somewhat unsharp. Thus, in the second embodiment, the data-inscribing device of which is different from the first embodiment, the objective lens 6 is supported by a retaining member 52 independently from the mask 51 to enable the inscribing image of both the N-size mode and the P-size mode to be completely focused images. In the second embodiment of this camera, the subject photographic portion and the picture-format switching mechanical portion are identical with those employed in the first embodiment; however, the mask comprised of members 51, and 52 in the second embodiment correspond to the mask comprised of element H in the first embodiment. The lower members of the mask of FIGS. 11 and 12 corresponding to the mask element 22 of FIG. 2 have been omitted for purposes of brevity. In addition, the light source 2 and the total reflection mirror 3 which are not shown in FIGS. 11 and 12, and the condenser lens 4, the liquid crystal display 5, the conductive rubber connector 10, and the mask P-ring 33, shown in FIGS. 11 and 12, are also identical with the components employed in the first embodiment. In the data-inscribing device of the second embodiment, the total reflection mirror 7 which reflects the luminous flux of the data inscription to the direction of the film 9 is attached to the supporting portion 51f of the mask 51 which moves upwardly and downwardly in accordance with the switching of the N-size and P-size modes. Meanwhile, the objective lens 6 is supported by the retaining member 52 independently from the mask 51. The retaining member 52 is slidable responsive to the moving direction of the mask 51, and is suspended between the mask 51 and the retaining member 52 is an extension spring 53. For the N-size mode, a predetermined relative-clearance is maintained between the mask 51 and the retaining member 52 (shown in FIG. 11). When the mode of the camera is being switched to the P-size mode from the N-size mode and the mask 51 is being moved downwardly such that the end face of the mask 51 can form the image plane of the P-size, an integral movement of the above described retaining member 52 with the mask 51 is stopped by a stopper 44k of the camera body as is shown in FIG. 12. Under this circumstance, the characters of the data-inscription on the image plane of P-size can be smaller than that of N-size and a focused image can be formed.

Figure 13:
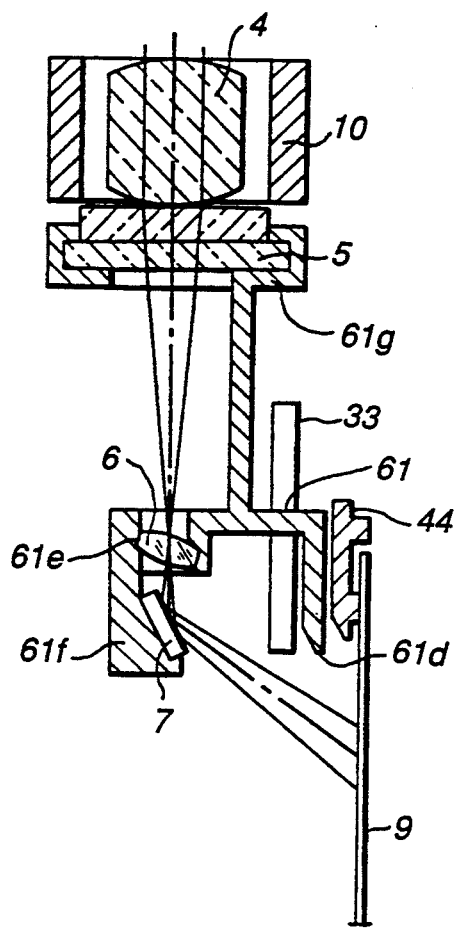
FIG. 13 is a view illustrating a configuration of an essential portion of the data-inscribing device in the normal-size mode in a third embodiment of the picture-format switchable camera according to the present invention.
Figure 14:
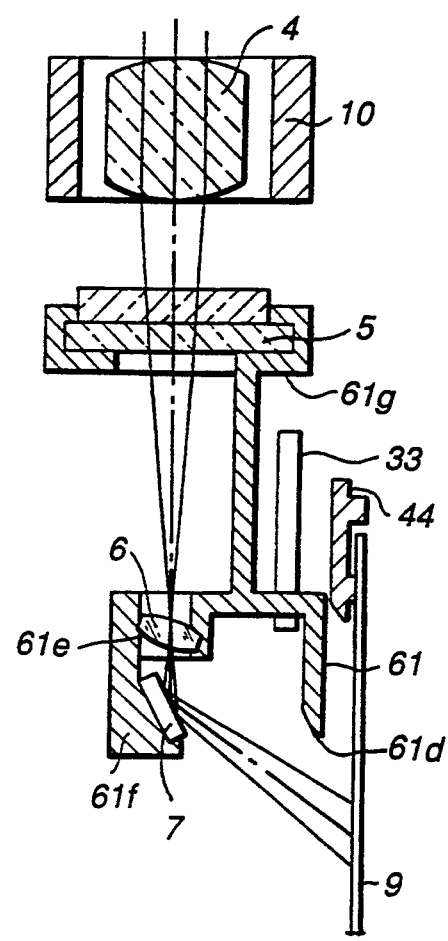
FIG. 14 is a view illustrating the data-inscribing device shown in FIG. 13 of the panoramic-size mode of the picture-format switchable camera.

A description of a third embodiment of the data-inscribing device of a picture-format switchable camera according to the present invention will now be given in conjunction with FIGS. 13 and 14 wherein FIG. 13 and FIG. 14 illustrate the conditions of the inscribing optical systems for the N-size mode and the P-size mode respectively.

In the third embodiment of the data-inscribing device, like the second embodiment, the condition of the image formation of the data inscription is improved such that the data-inscribing device has a configuration in which the liquid crystal display 5 is integrally supported by a mask 61 which retains the objective lens 6 and the total reflection mirror 7 of the image-forming optical system, thus providing a completely focused image on the image planes of both the N-size and P-size modes. Meanwhile, in the third embodiment of this camera, the subject photographic portion and the mechanical portion for the picture-format switching are identical with those used in the first embodiment. In addition, the light source 2, the total reflection mirror 3, and the photographic lens 8, which are not shown in FIGS. 13 and 14, and the condenser lens 4, the liquid crystal display 5, the conductive rubber connector 10, and the P-ring 33, shown in FIGS. 13 and 14, are also identical with the components employed in the first embodiment.

In the third embodiment of the data-inscribing device of the present invention, the objective lens 6 and total reflection mirror 7 are secured to the supporting portions 61e and 61f respectively of the mask 61 which moves upwardly and downwardly in accordance with the switching of the N-size and P-size modes. In addition, the liquid crystal display 5 is supported in a supporting portion 61g which is integrated in the mask 61 on the condenser lens 4 side of the upper portion of the mask 61. Accordingly, even if the mask 61 changes its position, the relationships in position among the liquid crystal display 5, the objective lens 6, the total reflection mirror 7, and the film 9 are constant, thus enabling the constantly focused image-formation of the data-inscription on the film 9.

The above described embodiments of the picture-format switchable camera can be applied to a single-focus camera and zoom lens camera if they are capable for the P-size mode with a data display function. Additionally, in the above embodiments of the present invention, a function of interlocking the data-inscribing optical system with the mask 11, 22 (FIG. 1) for example, is employed; however, the function of the camera of the present invention can be modified in such a manner that both the objective lens 6 and the reflection mirror 7 of the data-inscribing optical system are moved being interlocked with the selector knob 15 of the P-size mode.

What is claimed is:
1. A camera comprising:
a camera body;
taking lens at a forward end of the camera body;
a film positioned in a rearward end of the camera body;
irradiation means located in said camera body rearward of said taking lens, forward of said film and between an upper end of said camera body and one edge of said film for irradiating a surface of said film with data-inscription rays extending in a direction generally parallel with and in front of the film surface;
movable reflection means for reflecting said rays irradiated by said irradiation means towards said film surface;
picture-format switching means for selectively switching sizes of image planes on said film surface; and
means for changing an irradiating position of said data-inscription rays irradiated on said film surface by moving said reflection means responsive to said picture-format switching means.

2. A camera as defined in claim 1 wherein said picture format switching means includes means for switching picture formats by shading a first portion and a second portion of a film mask.

3. A camera as defined in claim 2 wherein said reflection means is moved in a predetermined direction by said means for changing an irradiating position.

4. A camera as defined in claim 1 wherein said reflection means reflects said data-inscription rays obliquely against said film surface.

5. A camera as defined in claim 1 wherein said irradiation means includes an image-forming optical system.

6. A camera as defined in claim 5 wherein said means for changing an irradiating position includes means for changing a focal length by moving said image-forming optical system.

7. A camera as defined in claim 5 wherein said reflection means is integrally moved with said image-forming optical system.

8. A camera comprising:
data-inscribing means arranged in an upper portion of the camera and away from a film surface for inscribing data on a front surface of the film during an exposure of said front surface;
picture-format switching means for selectively switching the size of image planes on said front surface;
movably mounted reflection means for reflecting data inscribing rays outputted by said data inscribing means onto said front surface; and
means for changing a position of data-inscription on said front surface by said data-inscribing means including means for moving said reflection means responsive to operation of said picture-format switching means.

9. A camera as defined in claim 1 wherein said reflection means reflects said data-inscription rays at an angle relative to said film surface, said angle assuring that said data-inscription rays impinge upon said film surface regardless of the image plane size selected.

10. A camera comprising:
irradiation means located above a film surface for irradiating data-inscription rays from an upper portion of said camera in a direction generally parallel with and in front of the film surface;
movable reflection means for reflecting said rays irradiated by said irradiation means towards said film surface;
picture-format switching means for selectively switching sizes of image planes on said film surface; and
means for changing an irradiating position of said data-inscription rays irradiated on said film surface by moving said reflection means responsive to said picture-format switching means;
said irradiation means comprises a radiation source and barrier means for isolating said radiation source from said reflection means and said film surface; and
optical means for directing radiation from said radiation source through said barrier means and toward said reflection means.

11. A camera as defined in claim 10 wherein said optical means includes means for focusing radiation from said radiation source and directing the focused radiation toward said reflection means.

12. A camera as defined in claim 1 wherein said irradiation means comprises a radiation source and barrier means for isolating said radiation source from said film surface;
optical means for directing radiation from said radiation source through said barrier means and toward said reflection means;
said optical means including optical focusing means movable with said reflection means.

13. A camera comprising:
irradiation means for irradiating data-inscription rays from an upper portion of said camera in a direction generally parallel with a film surface:
reflection means for reflecting said rays irradiated irradiation means towards said film surface;
picture-format switching means for selectively switching sizes of image planes on said film surface:
means for changing an irradiating position of said data-inscription rays irradiated on said film surface by moving said reflection means responsive to said picture-format switching means;
said irradiation means comprising a radiation source and barrier means for isolating said radiation source from said film surface:
optical means for directing radiation from said radiation source through said barrier means and toward said reflection means;
said optical means including optical focusing means movable with said reflection means;
said optical means further comprising:
an opening in said barrier means; and
second reflection means for directing radiation from said radiation source through said opening and toward said first-mentioned reflection means.

14. A camera as defined in claim 13 wherein said optical means further comprises:
image forming means arranged in an optical path between said opening and said reflection means whereby radiation passing through said image forming means forms an image on the film surface responsive to an image formed by said image forming means.

15. A camera as defined by claim 14 further comprising means for moving said image forming means responsive to movement of said first-mentioned reflection means.

16. A camera as defined in claim 12 further comprising resilient biasing means coupled between said optical focusing means and said means for moving said optical focusing means relative to said means upon movement of said reflection means.

17. A camera as defined in claim 10 wherein said barrier means comprises an electric circuit board, said radiation source being mechanically and electrically mounted thereon.

18. A camera as defined in claim 17 further comprising an image forming means mounted on said electric circuit board.

19. A camera as defined in claim 18 wherein said image forming means comprises liquid crystal display means.

20. A camera as defined in claim 19 wherein said display means and said radiation source are mounted on opposite sides of said barrier means.

21. A camera as defined in claim 1 wherein said picture format switching means further comprises first and second masks movable along a linear path in a first direction toward one another to define a smaller picture size and movable along said linear path in a second direction away from one another to define a larger picture size; and means for selectively moving said masks in said first and second directions.

22. A camera as defined in claim 21 wherein said means for selectively moving comprises a rotatable plate and slot means in said plate slidably engaging pins on each of said masks for moving said masks in said first and second directions responsive to respective rotation of said plate in first and second opposite directions.

23. A camera comprising:

irradiation means for irradiating data-inscription rays from an upper portion of said camera in a direction generally parallel with a film surface;

reflection means for reflecting said rays irradiated by said irradiation means towards said film surface;

picture-format switching means for selectively switching sizes of image planes on said film surface;

means for changing an irradiating position of said data-inscription rays irradiated on said film surface by moving said reflection means responsive to said picture-format switching means;

said picture format switching means further comprising first and second masks movable in a first direction toward one another to define a smaller picture size and movable in a second direction away from one another to define a larger picture size;

means for selectively moving said masks in said first and second directions;

said means for selectively moving comprising a rotatable plate and slot means in said plate slidably engaging pins on each of said masks for moving said masks in said first and second directions responsive to respective rotation of said plate in first and second opposite directions; and said reflection means being mounted upon one of said masks.

24. A camera according to claim 1 wherein said picture format switching means comprises at least one movable mask for masking a portion of the film surface, said reflection means being mounted on said mask.

* * * * *